US012592555B2

(12) United States Patent
Ewanchuk et al.

(10) Patent No.: US 12,592,555 B2
(45) Date of Patent: Mar. 31, 2026

(54) ACTIVE TURN OFF CONTROL GATE DRIVER FOR SOLID STATE CIRCUIT BREAKER

(71) Applicant: Hamilton Sundstrand Corporation, Charlotte, NC (US)

(72) Inventors: Jeffrey Ewanchuk, Manchester, CT (US); Baljit Riar, Rocky Hill, CT (US); Xin Wu, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 534 days.

(21) Appl. No.: 18/097,124

(22) Filed: Jan. 13, 2023

(65) Prior Publication Data

US 2024/0243567 A1 Jul. 18, 2024

(51) Int. Cl.
| | |
|---|---|
| *H02H 3/10* | (2006.01) |
| *H02H 1/00* | (2006.01) |
| *H02H 3/06* | (2006.01) |
| *H02H 3/08* | (2006.01) |
| *H02H 3/093* | (2006.01) |
| *H02H 9/02* | (2006.01) |

(52) U.S. Cl.
CPC ............ *H02H 3/10* (2013.01); *H02H 1/0007* (2013.01); *H02H 3/06* (2013.01); *H02H 3/066* (2013.01); *H02H 3/085* (2013.01); *H02H 3/093* (2013.01); *H02H 9/02* (2013.01); *H02H 9/025* (2013.01)

(58) Field of Classification Search
CPC ........ H02H 3/10; H02H 1/0007; H02H 3/066; H02H 3/093; H02H 3/085; H02H 9/02; H02H 3/06; H02H 9/025
See application file for complete search history.

(56) References Cited

U.S. PATENT DOCUMENTS

| | | | |
|---|---|---|---|
| 8,138,818 B2 | 3/2012 | Tsunoda et al. | |
| 8,610,485 B2 | 12/2013 | Hiyama | |
| 9,007,102 B2 | 4/2015 | Lobsiger et al. | |
| 9,019,001 B2 | 4/2015 | Kelley et al. | |

(Continued)

FOREIGN PATENT DOCUMENTS

CN 115201649 A 10/2022

OTHER PUBLICATIONS

Gerber et al. ("Gate Unit With Improved Short-Circuit Detection and Turn-Off Capability for 4.5-kV Press-Pack IGBTs Operated at 4-kA Pulse Current," in IEEE Transactions on Plasma Science, vol. 41, No. 10, pp. 2641-2648, Oct. 2013, doi: 10.1109/TPS.2013.2280379) (Year: 2013).*

(Continued)

*Primary Examiner* — Lisa M Caputo
*Assistant Examiner* — Christian T Bryant

(57) ABSTRACT

A method of open-loop fault control of a solid state circuit breaker includes the steps of populating a lookup table with predetermined current and temperature values and corresponding interrupt times, measuring a temperature of the solid state circuit breaker, measuring an electrical current passing through the solid state circuit breaker, estimating interrupt time from the lookup table based on the measured temperature and current values, determining to initiate a shutoff of the solid state circuit breaker based on the estimated interrupt time, and initiating a shutoff process of the solid state circuit breaker.

21 Claims, 7 Drawing Sheets

300

(56)                    References Cited

U.S. PATENT DOCUMENTS

|  |  |  |  |
|---|---|---|---|
| 9,030,054 B2 | 5/2015 | Jacobson et al. | |
| 9,425,786 B2 | 8/2016 | Zoels et al. | |
| 10,491,095 B2 | 11/2019 | Chen et al. | |
| 10,611,246 B2 | 4/2020 | Zhou et al. | |
| 11,115,019 B2 | 9/2021 | Lu et al. | |
| 2014/0029152 A1* | 1/2014 | Mazzola ............ | H03K 17/6871 |
| | | | 361/115 |
| 2017/0170817 A1 | 6/2017 | Salmia et al. | |
| 2019/0036324 A1 | 1/2019 | Jimenez et al. | |
| 2024/0223177 A1* | 7/2024 | Chen ...................... | H01H 71/74 |

OTHER PUBLICATIONS

MarroquÃ et al. ("Self-Powered 380 V DC SiC Solid-State Circuit Breaker and Fault Current Limiter," in IEEE Transactions on Power Electronics, vol. 34, No. 10, pp. 9600-9608, Oct. 2019, doi: 10.1109/TPEL.2019.2893104) (Year: 2019).*

Quan (A guide to using FETs for voltage controlled circuits, Part 1, EDN.com, Oct. 13, 2017) (Year: 2017).*

Rodrigues et al. ("A Review of Solid-State Circuit Breakers," in IEEE Transactions on Power Electronics, vol. 36, No. 1, pp. 364-377, Jan. 2021, doi: 10.1109/TPEL.2020.3003358.) (Year: 2021).*

Bortis et al. ("Double-stage gate drive circuit for parallel connected IGBT modules," in IEEE Transactions on Dielectrics and Electrical Insulation, vol. 16, No. 4, pp. 1020-1027, Aug. 2009, doi: 10.1109/TDEI.2009.5211849) (Year: 2009).*

European Search Report dated Jun. 19, 2024 in connection with European Patent Application No. EP 24151648.3, 8 pages.

* cited by examiner

ACTIVE TURN OFF CONTROL GATE DRIVER FOR SOLID STATE CIRCUIT BREAKER

STATEMENT REGARDING FEDERALLY SPONSORED RESEARCH OR DEVELOPMENT

This invention was made with government support under contract number 80GRC020F0166, awarded by The National Aeronautics and Space Administration. The government has certain rights in the invention.

BACKGROUND OF THE INVENTION

Interruption of a fault for high power solid state circuit breakers (SSCBs) does not occur immediately, due to the nature of high voltage power semiconductors which are at the heart of the SSCBs. The power semiconductors should be controlled to minimize the overvoltage stress, and fault energy, but prior solutions result in a sub-optimal balance of the two. Such a compromise is illustrated in FIG. 1, which is a diagram showing peak current vs rate of change of current for an example solid state circuit breaker controlled by a gate driver circuit, having a single preselected gate resistance. A balanced or compromise regime is contrasted with a desired operational regime Solid state circuit breakers, as schematically represented in FIG. 2, must interrupt currents that build up during a fault event. After the fault is detected, current continues to build up in the SSCB until the semiconductors can break the fault current. The interrupt time ($t_{int}$), which is the time between detection and interruption is calculated as follows:

$$t_{int} = (i_{peak} - I_L) \cdot L_{in}/V$$

Higher currents cause larger SSCB losses, and more stored inductor energy to dissipate. To minimize the turn off time, the gate resistances of the MOS-gated semiconductors should be minimized. In short, the interrupt time (($t_{int}$) is proportional to gate resistance ($R_g$), which is proportional to peak current (peak):

$$t_{int} \propto R_g \propto i_{peak}$$

However, reducing gate resistance ($R_g$) alone does not yield satisfactory results, as small gate resistances lead to high current rate change (di/dt), which lead to large over-voltages in the SSCB, potentially requiring derating or large snubber circuits. In short, over-voltage during shutoff ($V_{over}$) is proportional to the inverse of gate resistance ($1/R_g$):

$$V_{over} \propto 1/R_g$$

Although generally considered satisfactory for their intended purpose, prior art drivers of SSCB semiconductors must balance the peak turn off current ($i_{peak}$), to mitigate over-voltage during shutoff ($V_{over}$), and the turn off speed ($t_{int}$)—leading to a suboptimal compromise in both qualities, as illustrated in FIG. 1.

Accordingly, Applicant recognizes that there remains a need in the art for robust and affordable solutions to more effectively minimize over-voltage during shutoff ($V_{over}$), while also minimizing off speed ($t_{int}$). The devices, systems and related methods of the present disclosure provide solutions for this need.

SUMMARY OF THE INVENTION

In accordance with the present invention, devices, systems and methods are provided that effectively minimize over-voltage during shutoff ($V_{over}$) of solid-state switches—particularly SSCBs—while also minimizing turn off speed ($t_{int}$).

In accordance with one aspect of the invention, a method of open-loop fault control of a solid state circuit breaker includes the steps of populating a lookup table with predetermined current and temperature values and corresponding interrupt times, measuring a temperature of the solid state circuit breaker, measuring an electrical current passing through the solid state circuit breaker, estimating interrupt time from the lookup table based on the measured temperature and current values, determining to initiate a shutoff of the solid state circuit breaker based on the estimated interrupt time, and initiating a shutoff process of the solid state circuit breaker.

In accordance with this aspect, the shutoff process can include the steps of discontinuing a gate drive voltage signal to a gate of the solid state circuit breaker, electrically engaging at least two separately controllable turn-off resistive elements with the gate of the solid state circuit breaker in order to reduce gate resistance and thereby reduce turn-off time, and electrically disengaging one of the at least two separately controllable resistive elements from the gate of the solid state circuit breaker after a predetermined time in order to minimize the severity of an overvoltage condition of the solid state circuit breaker.

The predetermined time can be about the same as an interrupt time.

The subject methods can further include the step of electrically disengaging all remaining engaged ones of the at least two separately controllable resistive elements from the gate of the solid state circuit breaker, at a time after gate voltage has fallen below a gate threshold voltage.

In accordance with the invention, the lookup table can be populated based on experimental data. Alternatively, the lookup table can be populated based on mathematically derived data.

Methods in accordance with the invention can further include the step of automatically resetting the solid state circuit breaker after a gate voltage has fallen below a gate threshold voltage. The step of automatically resetting the solid state circuit breaker can include the step of reinitiating a previously discontinued gate drive voltage signal.

In accordance with a further aspect of the invention, a solid state circuit breaker with open-loop control system includes a gate-controlled solid state switch, a temperature sensor in thermal conduction with the gate-controlled solid state switch, adapted and configure to output a temperature-dependent electrical signal, a current sensor, adapted to detect current passing through the gate-controlled solid state switch, and configured to output a current-dependent electrical signal, a gate driver circuit adapted to receive one or more control signals and configured and control gate voltage of the gate-controlled switch, a gate driver controller configured to produce one or more control signals and adapted to provide said one or more control signals to the gate driver circuit, the gate driver controller further adapted to receive the temperature-dependent electrical signal and the current-dependent electrical signal, the gate driver controller having a memory, and one or more lookup tables stored within the memory of the gate driver controller, the one or more lookup tables being populated with temperature and current values corresponding to interrupt times of the gate-controlled solid state switch.

The gate driver controller can be adapted and configured to initiate a turn-off process if detected temperature and current correlate to a predetermined turn-off condition, as determined by the one or more lookup tables.

The gate-controlled solid state switch can be a MOSFET. The gate-controlled solid state switch can be an IGBT.

In accordance with the invention, the subject solid state circuit breakers can further include at least two separately controllable turn-off resistive elements adapted to electrically conduct between the gate of the solid state circuit breaker and a drain, in order to reduce gate resistance and thereby reduce turn-off time. A resistance of a first one of the at least two separately controllable turn-off resistive elements can be greater than a resistance of a second one of the at least two separately controllable turn-off resistive elements.

In accordance with one aspect, a first one of the one or more control signals of the gate driver controller can cause the gate driver circuit to supply a turn-on gate voltage, which is higher than gate threshold voltage.

A second one of the one or more control signals of the gate driver controller can cause the gate driver circuit to engage a first one of the at least two separately controllable turn-off resistive elements.

A third one of the one or more control signals of the gate driver controller causes the gate driver circuit to engage a second one of the at least two separately controllable turn-off resistive elements.

The at least two separately controllable turn-off resistive elements can comprise transistors connected between gate of the gate-controlled solid state switch and a current sink.

BRIEF DESCRIPTION OF THE DRAWINGS

So that those skilled in the art to which the subject disclosure appertains will readily understand how to make and use the devices, systems and methods of the subject disclosure without undue experimentation, embodiments thereof will be described in detail herein below with reference to certain figures, wherein.

DETAILED DESCRIPTION OF THE INVENTION

Figure 1:
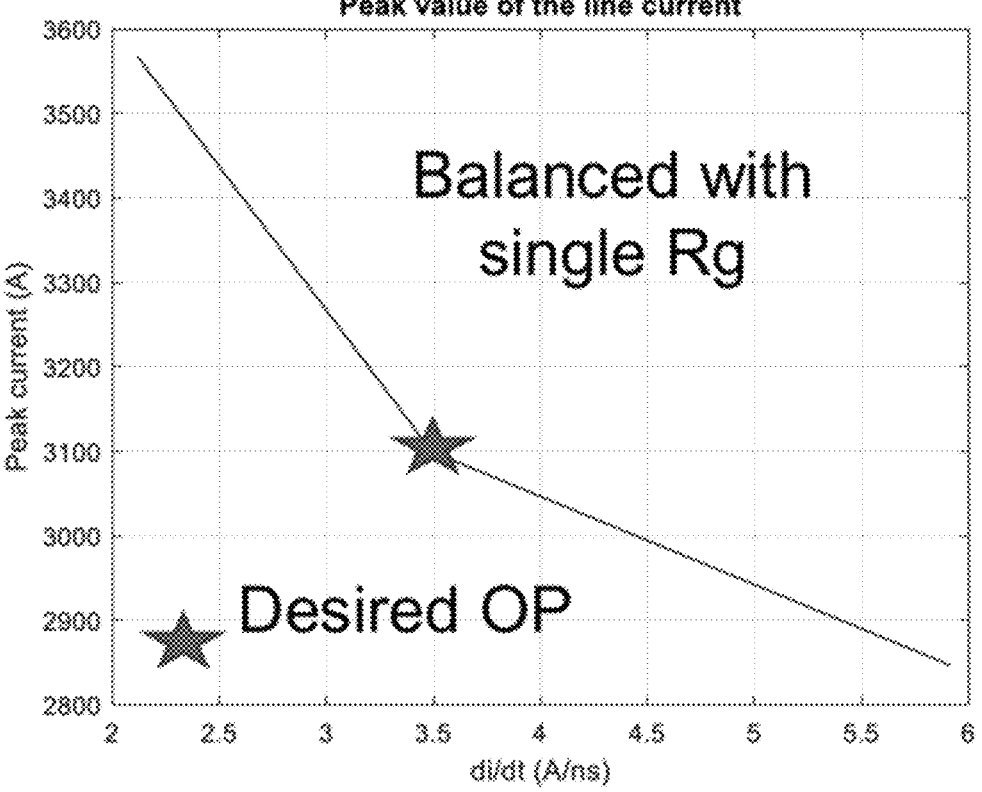
FIG. 1 is a diagram showing peak current vs rate of change of current for an example solid state circuit breaker controlled by a gate driver circuit having a single preselected gate resistance, illustrating a balanced or compromise regime as compared with desired operational regime.
Figure 2:
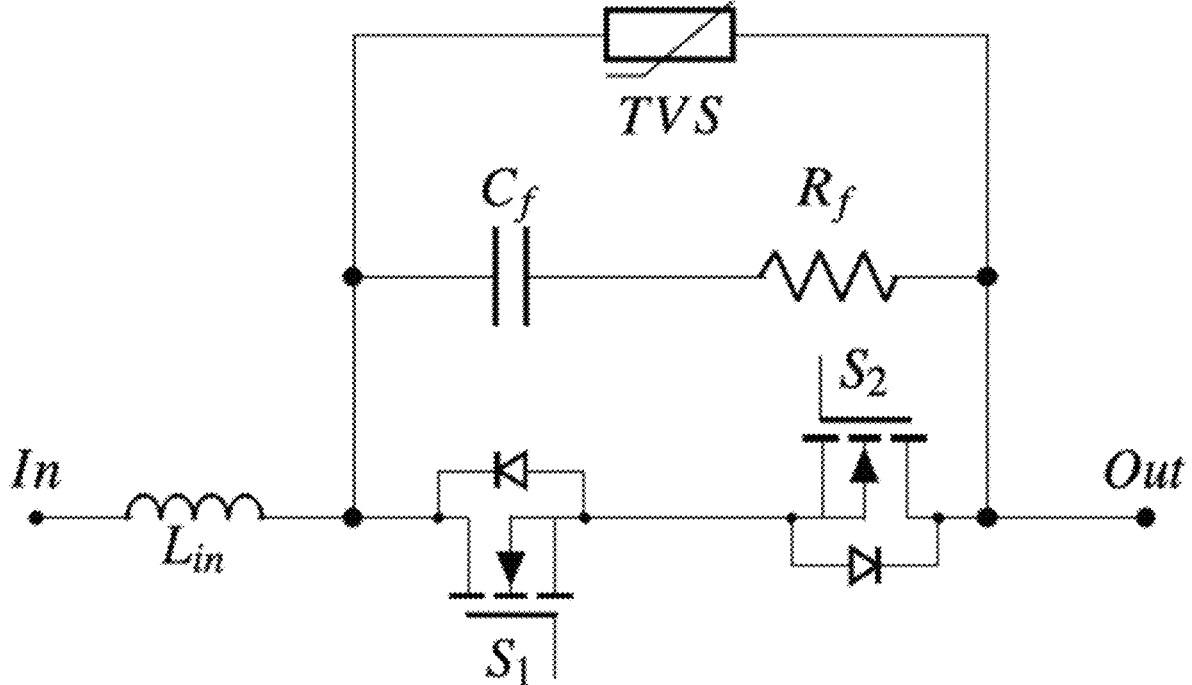
FIG. 2 is an example schematic of a solid state circuit breaker in accordance with the prior art.

Reference will now be made to the drawings wherein like reference numerals identify similar structural features or aspects of the subject disclosure.

The present invention relates to open-loop gate drivers with selectively controlled gate resistances to minimize the fault development time, while also reducing the current-time derivative during turn off of solid-state switches, particularly SSCBs. The solid-state switches being used can be MOSFET, an IGBT or similar solid state switch. In accordance with one preferred aspect, devices and systems of the present invention employ pre-calibrated device junction temperature ($T_j$), and load current ($I_L$) information in a look up table (LUT), such that an estimate is derived for the duration of the fault interruption time ($t_{int}$). This interrupt time ($t_{int}$) is used in conjunction with the gate driver circuit to control the fault turn off of a solid state circuit breaker.

This benefit results in minimal overvoltage stress on the SSCB, and minimal stored fault energy, which would later have to be dissipated in the SSCB. Further, control circuits in accordance with the subject devices, systems and methods can be integrated in a single integrated circuit (IC) with minimal cost, if so desired. Consequently, a smaller more compact SSCB can be produced with marginal cost implications.

Figure 3:
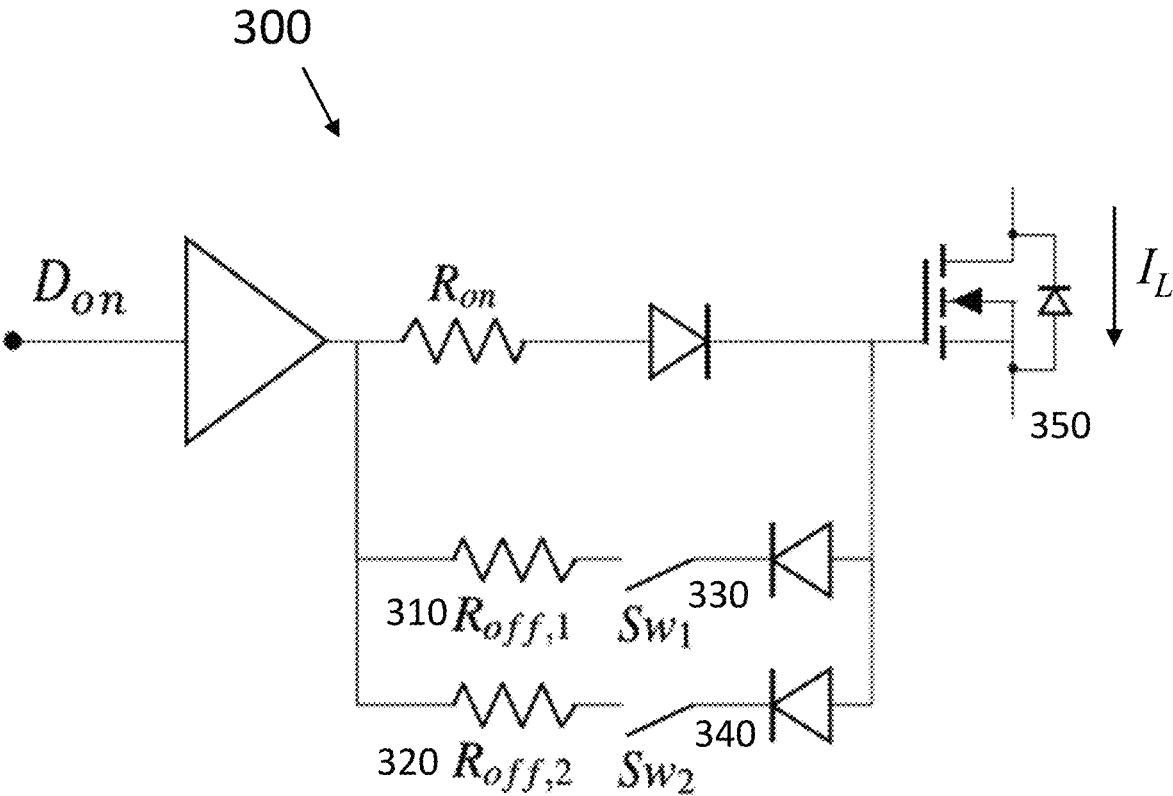
FIG. 3 is functional schematic representation of a gate driver circuit in accordance with the present invention.

FIG. 3 is functional schematic representation of a gate driver circuit 300 in accordance with the present invention. Using control circuitry comprising an integrated circuit or discrete components, the gate driver circuit 300 has at least two turn off gate resistances $R_{off,1}$ 310 and $R_{off,2}$ 320. These resistances are switched in based on the turn off operation of the power semiconductor 350, which is correlated from the measured fault current ($I_L$) and device temperature ($T_j$).

Figure 4:
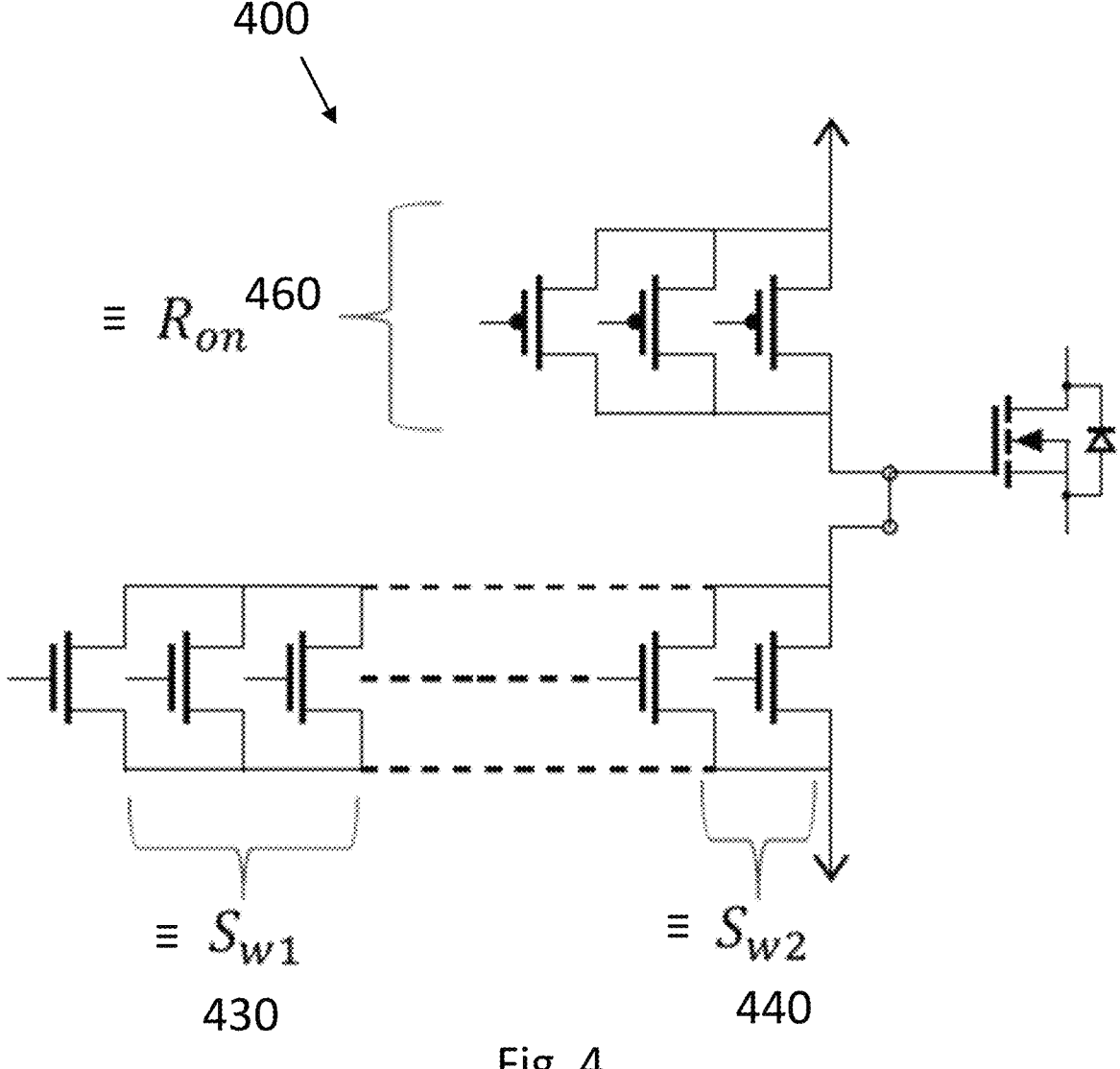
FIG. 4 is an alternate schematic representation of a gate driver circuit in accordance with the present invention.

FIG. 4 is a schematic representation of a gate driver circuit 400 in accordance with the present invention, wherein the function of the elements of gate driver circuit 300 of FIG. 3 is embodied in the form of a plurality of transistors, as indicated.

The function of $Sw_1$ and $R_{off,1}$, and its related diode of FIG. 3 is achieved by a plurality of transistors 430, while the function of $Sw_2$ and $R_{off,2}$, and its related diode of FIG. 3 is achieved by a plurality of transistors 440. Notably, the schematic illustrates unequal numbers of transistors in each segment, which allows for different equivalent resistances per grouping 430, 440. Similarly the turn on resistor ($R_{on}$) and its related diode of FIG. 3 are functionally replaced by a further set of transistors 460. It should be understood that the precise quantity and type of transistors illustrated should not be construed as limiting. In particular, incorporation of multiple additional turn-off transistors (or in the case of circuit 300, switches and resistors) can be added, depending on the desired implementation.

Figure 5:
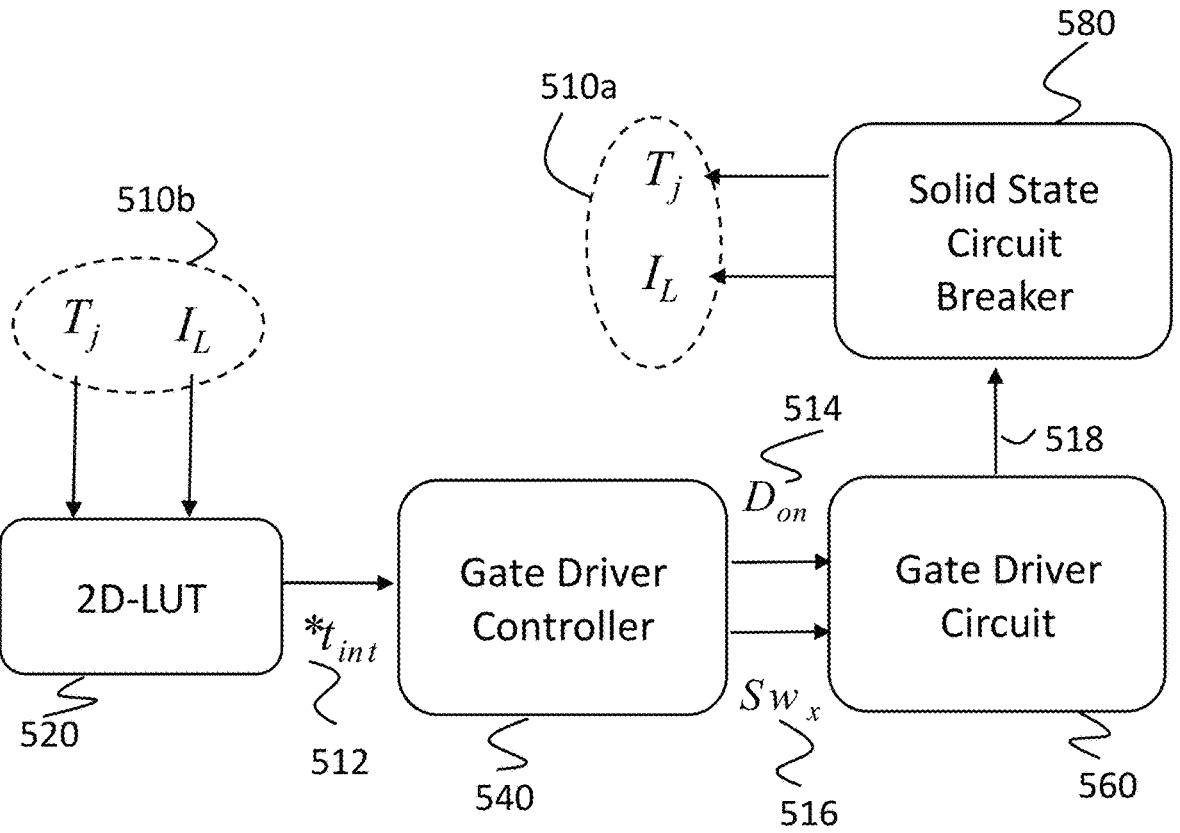
FIG. 5 is a block diagram illustrating elements of a gate driver in accordance with the present invention.

FIG. 5 is a block diagram illustrating elements of a gate driver, including gate driver circuit 560 as described above, and also a gate driver controller 540, which controls the gate driver circuit 560. The controller 540 can be a microprocessor, microcontroller, Application Specific Integrated Circuit (ASIC), Programmable Logic Device (PLD) or can be discrete analog or digital circuitry. The controller can produce a modulation signal, of a form such as a pulse train, pulse width modulated (PWM) signal or similar, to control the gate modulation.

A lookup table 520, stored within memory of the gate driver controller 540 is illustrated and it is with the values stored therein that inputs 510b of temperature ($T_J$) and current ($I_L$) are compared in order to output an interrupt time ($t_{int}$) 512, which value is provided to the gate driver controller 540 in order to make a determination on initiating turn-off. The gate driver controller 540 selectively outputs a drive signal ($D_{on}$) 514 to the gate driver circuit 560, as well as control signals $Sw_x$ 516 to selectively engage two or more turn-off resistances, as described herein, particularly with reference to FIGS. 6 and 7.

The gate driver circuit 560, in-turn, outputs a control signal 518 to signal the SSCB 580 to turn on. Temperature ($T_J$) and current ($I_L$) values 510a are in-turn continually provided and compared to the lookup table 520, monitored by the gate driver controller and provided by external sensors.

Notably, even though the elements of lookup table 520, gate driver controller 540, gate driver circuit 560 and SSCB 580 are depicted as separate elements, it is to be understood that multiple, and indeed all elements can be provided in one package if desired.

Figure 6:
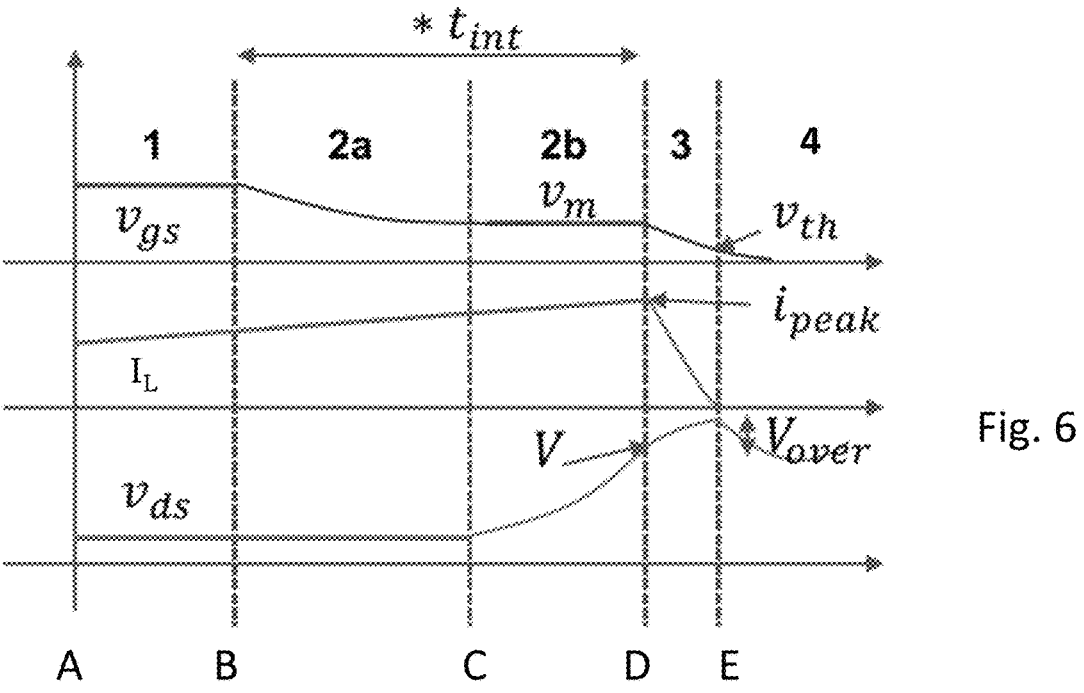
FIG. 6 is a plot of various operating parameter waveforms for an example gate driver circuit in accordance with the present invention.
Figure 7:
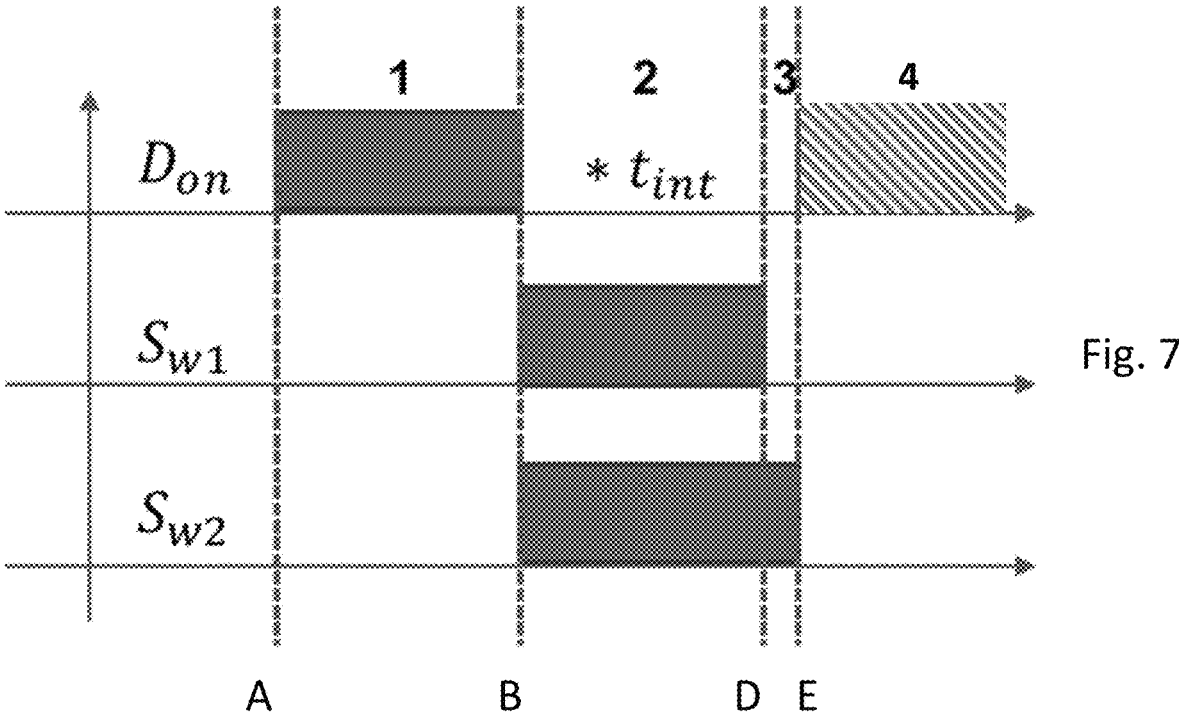
FIG. 7 is a gate driver switching diagram for an example gate driver circuit in accordance with the present invention.

Reference will now be made to FIG. 6 and FIG. 7, a plot of various operating parameter waveforms and a gate driver switching diagram, respectively, for an example gate driver circuit in accordance with the present invention.

The gate driver circuit is adapted and configured to select at least two sets of turn off resistors. Before turn off, the temperature ($T_J$) and current ($I_L$) are sampled; and the interrupt time *$t_{int}$ estimated based on lookup tables discussed below.

Under normal operation, at time A (defining start of period 1) the power switch is on ($D_{on}$, FIG. 1). As current ($I_L$) rises, sampled values indicate that turn-off is required at time B. Accordingly, at least two turn-off resistors are engaged to quickly reduce gate voltage by reducing gate resistance ($R_g$), thereby minimizing overall interrupt time ($t_{int}$). Notably, voltage drop across the solid state switch ($V_{ds}$) begins to increase during period 2b, and therefore at time D, at least one of the turn-off resistors (but not all)—in this case the turn-off resistor corresponding to $S_{w1}$—is disengaged, thereby increasing gate resistance ($R_g$), while still continuing to reduce gate voltage.

The turn-off resistor corresponding to $S_{w2}$ remains active through period 3, where current ($I_L$) decreases to zero and gate voltage meets the threshold voltage ($V_{th}$), after which point (time E), the turn-off resistor corresponding to $S_{w2}$ is disengaged.

In accordance with one preferred aspect, the smallest turn off resistor—in this case that corresponding to $S_{w1}$—is switched for the duration of the estimated interrupt time ($t_{int}$) i.e., period 2. At least one turn off resistor is removed at time D, increasing the gate resistance during the current evolution time, i.e., period 3.

In accordance with one aspect, a margin to the interrupt time estimate can be used such that the smallest turn off resistor is not used in period 3.

Optionally, the gate driver controller can be configured to automatically return the gate driver control signal to normal after a fault is cleared. This optional feature is illustrated in FIG. 7 in hashed line during period 4. It should be noted that the waveforms of FIG. 3 assume that the SSCB remains in an off state during period 4.

In the foregoing manner, overvoltage ($V_{over}$) is mitigated, along with potential exacerbated voltage oscillations. In this manner reduced interrupt time ($t_{int}$) and reduction of overvoltage ($V_{over}$) are both optimized.

Typically, the current evolution and voltage evolution periods can significantly change depending on many factors. In accordance with one aspect of the present invention, however, by taking a conservative margin on the interrupt time estimate, and noting that the SSCB only needs to consider the turn off time, the current evolution time can be ignored and only the voltage evolution period needs to be considered. By incorporating the current magnitude and device temperature at turn off, the time to and the duration of the voltage evolution can be estimated. In accordance with the invention, depending on the implementation, it may be necessary to add additional short circuit protection.

Figure 8:
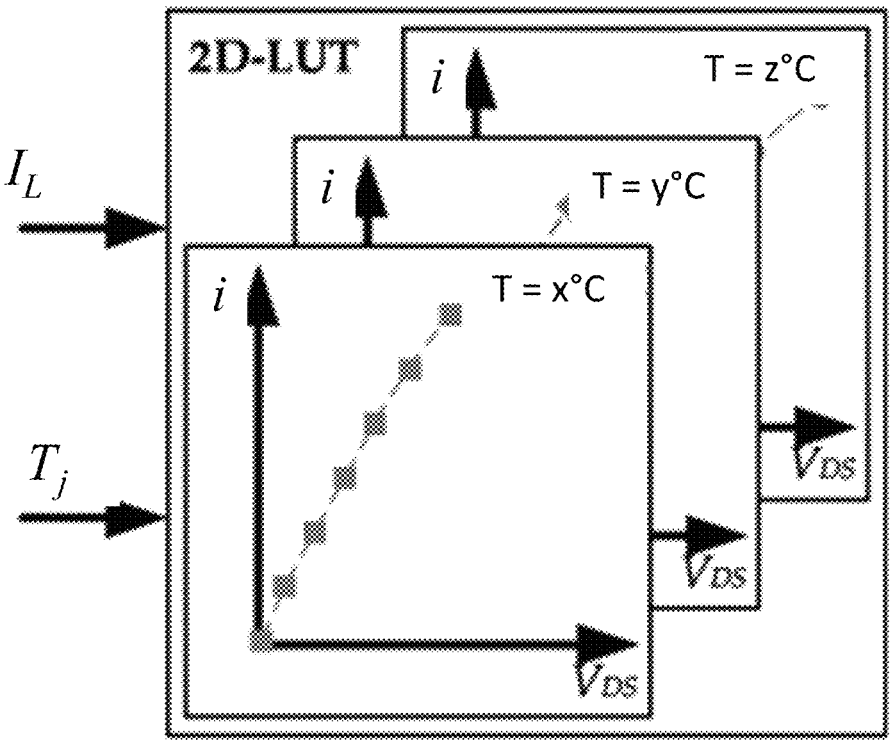
FIG. 8 is an illustration of a 2-D lookup table (LUT), populated with values for) different temperatures x, y, z (T) and currents (i)
Figure 9:
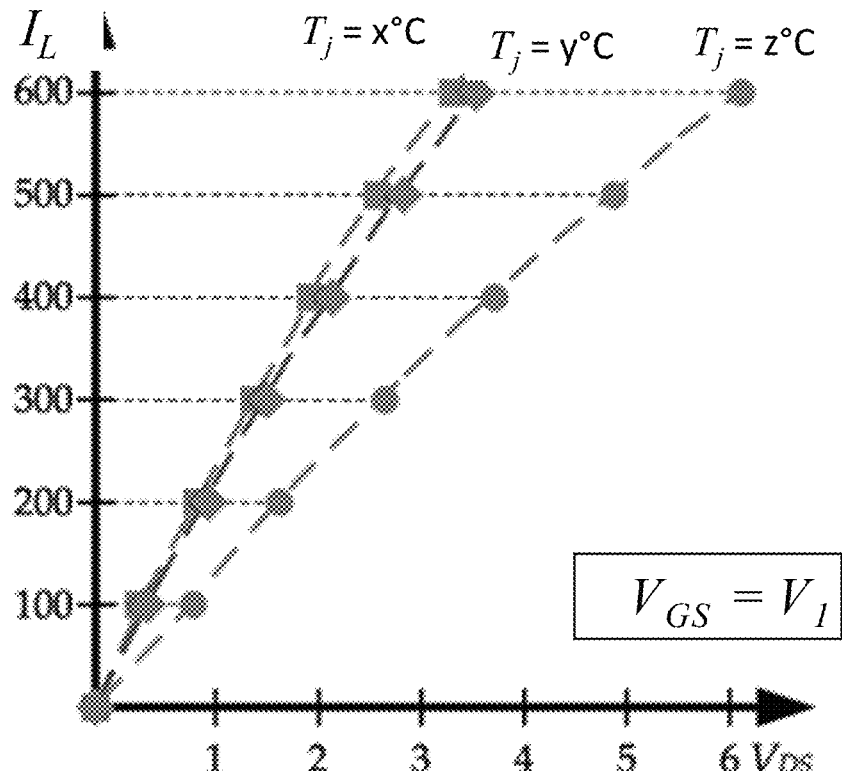
FIG. 9 is an illustrating depicting superimposition of the temperature-dependent curves of FIG. 8 for a given gate voltage ($V_{GS}$).

With reference to FIGS. 8 and 9, FIG. 8 is an illustration of an example 2-D lookup table (LUT), populated with sample values for different temperatures x, y, z (T) and currents (i), while FIG. 9 is an illustration depicting superimposition of the temperature-dependent curves of FIG. 8 for a given gate voltage ($V_{GS}$). In accordance with the invention and depending on the desired implementation, there are various options for populating a lookup table and using the stored values to determine (or alternatively to calculate) when to initiate an interrupt of a solid state circuit breaker in accordance with the invention.

In accordance with a preferred aspect, in open loop (no feedback) control, with the smallest gate resistance value possible to minimize turn-off time, the turn off time ($t_{int}$) of the semiconductors in the SSCB is measured against a changing current and device temperature. A look up table (LUT) is populated as a function of these two input variables and stored into the memory of the gate driver circuit. This is the calibration phase and is necessary to determine the approximate interruption time for the SSCB.

In one aspect, and in accordance with the invention, lookup tables can be populated with experimentally derived data, correlating device temperature ($T_J$) and measured current ($I_L$) with actual interrupt time ($t_{int}$).

In other aspects, lookup table data can be populated with theoretically predicted (calculated) values based on known values and on certain measured parameters, such as current and temperature as discussed below.

Use of device temperature ($T_j$) as a meaningful input variable for the subject control methods, and devices and systems incorporating such methods is due to the temperature-dependence on certain parameters of solid state circuitry, in particular of MOSFETs.

In MOSFETs, for example, source-drain resistance ($R_{ds}$) varies with device temperature. With rising device temperature, source-drain resistance ($R_{ds}$) also increases. Therefore, for any measured current value passing through a MOSFET (or alternatively extrapolated current value), such current will correlate to a larger voltage drop (Vas) than would be predicted at a lower device temperature. Combined with overvoltage ($V_{over}$) at shutoff, which is to be minimized ($V_{over} \propto 1/R_g$) results in a total peak voltage ($V_{ds}$).

Accordingly, a lookup table can be populated with values of current, depending on temperature, and their correlating voltages ($V_{ds}$) as illustrated in FIG. 9 for example.

Moreover, gate threshold voltage ($V_{th}$) varies inversely with increasing device temperature ($T_j$). As device temperature increases, threshold voltage ($V_{th}$) decreases. Accordingly, interrupt times ($t_{int}$) will be longer at higher temperatures.

However, depending on the degree of variability in the predicted operating range, it may be desirable to make certain assumptions if the effect of certain variables is expected to be negligible. Naturally, devices and systems manufactured in accordance with the invention can be tested to ensure that all design requirements are ultimately achieved.

Further, source-drain resistance ($R_{ds}$) of solid-state switches, such as MOSFETs, varies with applied gate voltage ($V_{GS}$). Accordingly, if desired, this factor can be accounted for with one or more lookup tables, based on known applied gate voltage ($V_{GS}$), if such voltage is intended to vary during operation.

After the fault is detected, current continues to build up in the SSCB until the semiconductors can break the fault current. The interrupt time ($t_{int}$) is a function of the semiconductor turn off characteristics. The peak current ($i_{peak}$), is a function of this interrupt time ($t_{int}$), the line inductance ($L_{in}$), nominal current, ($I_L$), and the operating voltage (V), with $I_{peak}=I_L+V/L_{in}*t_{int}$.

Accordingly, measurement of current (and/or optionally a calculation of rate of current change (di/dt)) can be correlated to a predicted interrupt time ($t_{int}$). With reference to FIGS. 6 and 7, if a fault is detected at time B, the control signal ($D_{on}$) is cut off, and gate turn-off resistors are engaged with $S_{w1}$ and $S_{w2}$.

Based on the power semiconductor properties in the SSCB, the interrupt time is a function of the external voltage, and the semiconductor properties, i.e., the transconductance (gm), the effective output capacitance ($C_{oss}$), the gate resistance ($R_g$), the effective input capacitance ($C_{iss}$), the threshold voltage (Vt), the high gate voltage ($V_{dd}$), the low gate voltage ($V_{ss}$), and the gate-drain capacitance ($C_{gd}$). During the turn off delay period, the approximate time in interval 2a is given by:

$$t_{int}(2a) = R_g C_{iss} \frac{V_{dd} - \dfrac{I_L}{gm}}{V_t + \dfrac{I_L}{gm} - Vss}$$

In interval 2b, the approximate time is given by:

$$t_{int}(2b) = V \cdot \frac{C_{oss} + gmR_g C_{gd}}{gm(Vt - Vss) + I_L}$$

Hence, the approximate interrupt time, tint, is the combination of these two intervals, i.e., $$t_{int}* = R_g C_{iss} \frac{V_{dd} - \dfrac{I_L}{gm}}{V_t + \dfrac{I_L}{gm} - Vss} + V \cdot \frac{C_{oss} + gmR_g C_{gd}}{gm(Vt - Vss) + I_L}.$$

However, as the semiconductor transconductance, gm, is thermally sensitive, the interrupt time is dependent on both the measured current ($I_L$) and the junction temperature ($T_j$). As such, by measuring current ($I_L$) and temperature ($T_j$) (which can also affect Resistance (R) values, and therefore a relationship between measured current ($I_L$) and Voltage ($V_{GS}$)), such values can be compared to sets of known values stored in one or more lookup tables and their corresponding interrupt time. More particularly, values of current ($I_L$) and temperature ($T_j$) which are predetermined to result in an unsatisfactorily long interrupt time ($t_{int}$), can be translated by the subject devices, systems and methods into an instruction to commence turn-off of the SSCB. In that manner, the methods, devices and systems of the present invention allow for initiation of a turn-off sequence at a point sufficiently early to minimize excess current ($I_L$) and concomitant hardware damage that might occur.

The LUT can be populated by a calibration step, wherein the current and temperature of the SSCB are varied and the interrupt time is measured and stored for each data point.

In accordance with the above-described invention, many benefits are achieved. In short, implementation of a two variable look up table to compute an estimated interrupt time minimizes complexity over any prior schemes. Applicant has conceived that interrupt time can be satisfactorily primarily resolved to two input variables (current and device temperature) for use in the lookup table (LUT). Additionally, with temperature estimation, and measurement techniques becoming standard for power electronic semiconductors, it is feasible to employ these two variables alone to estimate the interrupt time.

In accordance with the invention, targeting a desired interrupt time simply necessitates control of at least two sets of resistors with no control additional control routines. In accordance with the invention, control of current evolution is ignored in favor of minimizing the interrupt time. If desired, all functional elements can be integrated on single IC: A/D, memory, staged gate driver and control. In accordance with the invention, the controlled SSCB can be a separate element, but depending on the precise implementation can be integrated together in one package with other components.

While the devices, systems and methods of the subject disclosure have been shown and described with reference to embodiments, those skilled in the art will readily appreciate that changes and/or modifications may be made thereto without departing from the spirit and scope of the subject disclosure.

What is claimed is:

1. A method of open-loop fault control of a solid state circuit breaker, comprising:

populating a lookup table with predetermined current and temperature values and corresponding interrupt times;

measuring a temperature of the solid state circuit breaker;

measuring an electrical current passing through the solid state circuit breaker;

estimating an interrupt time from the lookup table based on the measured temperature and current values;

determining to initiate a shutoff of the solid state circuit breaker based on the estimated interrupt time; and initiating a shutoff process of the solid state circuit breaker, the shutoff process comprising engaging and disengaging resistive elements, wherein disengaging the resistive elements comprises electrically disengaging one of at least two separately controllable turn-off resistive elements from a gate of the solid state circuit breaker after a predetermined time in order to minimize severity of an overvoltage condition of the solid state circuit breaker, the predetermined time equal to the estimated interrupt time.

2. The method of claim 1, wherein engaging the resistive elements comprises:

discontinuing a gate drive voltage signal to the gate of the solid state circuit breaker; and electrically engaging the at least two separately controllable turn-off resistive elements with the gate of the solid state circuit breaker in order to reduce gate resistance and thereby reduce turn-off time.

3. The method of claim 2, further comprising:

electrically disengaging all remaining engaged ones of the at least two separately controllable resistive elements from the gate of the solid state circuit breaker at a time after a gate voltage has fallen below a gate threshold voltage.

4. The method of claim 1, wherein the lookup table is populated based on experimental data.

5. The method of claim 1, wherein the lookup table is populated based on mathematically derived data.

6. The method of claim 1, further comprising:

automatically resetting the solid state circuit breaker after a gate voltage has fallen below a gate threshold voltage.

7. The method of claim 6, wherein automatically resetting the solid state circuit breaker comprises the step of: reinitiating a previously discontinued gate drive voltage signal.

8. A solid state circuit breaker with open-loop control system comprising:

a gate-controlled solid state switch;

a temperature sensor in thermal conduction with the gate-controlled solid state switch and configured to output a temperature-dependent electrical signal;

a current sensor configured to detect current passing through the gate-controlled solid state switch and configured to output a current-dependent electrical signal;

a gate driver circuit configured to receive one or more control signals and to control a gate voltage of the gate-controlled solid state switch;

at least two separately controllable turn-off resistive elements;

a gate driver controller configured to:

produce the one or more control signals;

provide the one or more control signals to the gate driver circuit;

receive the temperature-dependent electrical signal and the current-dependent electrical signal; and initiate a shutoff process of the solid state circuit breaker by engaging and disengaging the at least two separately controllable turn-off resistive elements based on an estimated interrupt time, wherein disengaging the at least two separately controllable turn-off resistive elements comprises electrically disengaging one of the at least two separately controllable turn-off resistive elements from the gate-controlled solid state switch after a predetermined time in order to minimize severity of an overvoltage condition of the solid state circuit breaker, the predetermined time equal to the estimated interrupt time; and one or more lookup tables stored within a memory of the gate driver controller, the one or more lookup tables populated with temperature and current values corresponding to interrupt times of the gate-controlled solid state switch.

9. The solid state circuit breaker of claim 8, wherein the gate driver controller is configured to initiate the shutoff process if detected temperature and current correlate to a predetermined turn-off condition as determined by the one or more lookup tables.

10. The solid state circuit breaker of claim 8, wherein the gate-controlled solid state switch is a MOSFET.

11. The solid state circuit breaker of claim 8, wherein the gate-controlled solid state switch is an IGBT.

12. The solid state circuit breaker of claim 8, wherein the at least two separately controllable turn-off resistive elements are configured to electrically conduct between a gate of the solid state circuit breaker and a drain of the solid state circuit breaker in order to reduce gate resistance and thereby reduce turn-off time.

13. The solid state circuit breaker of claim 8, wherein a resistance of a first one of the at least two separately controllable turn-off resistive elements is greater than a resistance of a second one of the at least two separately controllable turn-off resistive elements.

14. The solid state circuit breaker of claim 8, wherein a first one of the one or more control signals causes the gate driver circuit to supply a turn-on gate voltage, which is higher than a gate threshold voltage of the gate-controlled solid state switch.

15. The solid state circuit breaker of claim 14, wherein a second one of the one or more control signals of the gate driver controller causes the gate driver circuit to engage a first one of the at least two separately controllable turn-off resistive elements.

16. The solid state circuit breaker of claim 15, wherein a third one of the one or more control signals causes the gate driver circuit to engage a second one of the at least two separately controllable turn-off resistive elements.

17. The solid state circuit breaker of claim 8, wherein the at least two separately controllable turn-off resistive elements comprise transistors connected between a gate of the gate-controlled solid state switch and a current sink.

18. A solid state circuit breaker comprising:

a gate-controlled solid state switch;

a temperature sensor in thermal conduction with the gate-controlled solid state switch and configured to output a temperature-dependent electrical signal;

a current sensor configured to detect current passing through the gate-controlled solid state switch and to output a current-dependent electrical signal;

a gate driver circuit configured to receive one or more control signals and to control a gate voltage of the gate-controlled solid state switch;

at least two separately controllable turn-off resistive elements;

a gate driver controller configured to:

produce the one or more control signals;

provide the one or more control signals to the gate driver circuit;

receive the temperature-dependent electrical signal and the current-dependent electrical signal; and initiate a shutoff of the solid state circuit breaker by engaging and disengaging the at least two separately controllable turn-off resistive elements, wherein disengaging the at least two separately controllable turn-off resistive elements comprises electrically disengaging one of the at least two separately controllable resistive elements from the gate-controlled solid state switch after a predetermined time in order to minimize severity of an overvoltage condition of the solid state circuit breaker; and one or more lookup tables stored within a memory of the gate driver controller, the one or more lookup tables populated with temperature and current values corresponding to interrupt times of the gate-controlled solid state switch;

wherein the gate driver controller is configured to initiate the shutoff of the solid state circuit breaker using an estimated interrupt time from the one or more lookup tables, the estimated interrupt time based on the temperature-dependent electrical signal and the current-dependent electrical signal; and wherein the predetermined time is equal to the estimated interrupt time.

19. The solid state circuit breaker with open-loop control system of claim 18, wherein a resistance of a first one of the at least two separately controllable turn-off resistive elements is greater than a resistance of a second one of the at least two separately controllable turn-off resistive elements.

20. The solid state circuit breaker of claim 18, wherein engaging the resistive elements comprises:

discontinuing a gate drive voltage signal to the gate of the solid state circuit breaker; and electrically engaging the at least two separately controllable turn-off resistive elements with the gate of the solid state circuit breaker in order to reduce gate resistance and thereby reduce turn-off time.

21. The solid state circuit breaker of claim 18, wherein a first one of the one or more control signals causes the gate driver circuit to supply a turn-on gate voltage, which is higher than a gate threshold voltage of the gate-controlled solid state switch.

\* \* \* \* \*